United States Patent

Kim

Patent Number: 5,515,185
Date of Patent: May 7, 1996

[54] SINGLE PANEL TYPE LIQUID CRYSTAL DISPLAY PROJECTOR

[75] Inventor: Hoo-shik Kim, Suwon, Rep. of Korea

[73] Assignee: Samsung Aerospace Industries, Ltd., Kyongsangnam-do, Rep. of Korea

[21] Appl. No.: 215,692

[22] Filed: Mar. 22, 1994

[30] Foreign Application Priority Data

Mar. 24, 1993 [KR] Rep. of Korea ................... 93-4635

[51] Int. Cl.⁶ .................................................. G02F 1/1335
[52] U.S. Cl. ................................................. 359/40; 359/41
[58] Field of Search ........................................ 359/40, 41

[56] References Cited

U.S. PATENT DOCUMENTS

| | | | |
|---|---|---|---|
| 4,989,954 | 2/1991 | Yokoyama et al. | 359/40 |
| 5,060,058 | 10/1991 | Goldenberg et al. | 359/41 |
| 5,123,729 | 6/1992 | Kondo et al. | 359/49 |
| 5,144,462 | 9/1992 | Otsuka et al. | 359/41 |
| 5,172,254 | 12/1992 | Atarashi et al. | 359/40 |

FOREIGN PATENT DOCUMENTS

| | | | |
|---|---|---|---|
| 62-295025 | 12/1987 | Japan | 359/40 |
| 1-267612 | 10/1989 | Japan | 359/40 |
| 8505192 | 11/1985 | WIPO | 359/40 |

*Primary Examiner*—William L. Sikes
*Assistant Examiner*—Charles Miller
*Attorney, Agent, or Firm*—Leydig, Voit & Mayer

[57] ABSTRACT

A single panel type liquid crystal display projector includes a flat LCD panel oriented perpendicularly to a first optical axis, lighting means having an illumination source surrounded by a parabolic reflecting mirror for irradiating parallel light onto a rear side of the flat LCD panel, and an optical lens system for focusing, wherein the optical lens system is provided with a retrofocusing optical lens system which is located between the lighting means and the flat LCD panel, a flat reflecting mirror installed so as to be inclined with respect to the first optical axis at a predetermined angle of inclination, spaced apart by a predetermined distance from the LCD panel along the first optical axis so as to reflect light traveling along the first optical axis onto a second optical axis, and a focusing lens system composed of multiple lens groups arranged on the second optical axis and spaced apart by a predetermined distance from the intersection of the flat reflecting mirror and the first optical axis. The burden in manufacturing the lens necessitated by an upward projection produced in the conventional method is reduced and the overall size of the apparatus is miniaturized by reducing the length of the optical axis with an optical axis changeable system using a flat reflecting mirror, the manufacturing cost for the apparatus can be reduced.

2 Claims, 3 Drawing Sheets

SINGLE PANEL TYPE LIQUID CRYSTAL DISPLAY PROJECTOR

BACKGROUND OF THE INVENTION

The present invention relates to a single panel type liquid crystal display (LCD) projector, and more particularly, to a single panel liquid crystal display projector which can satisfy the focus characteristic by inserting a mirror in the optical axis of an optical system and miniaturize the size of the apparatus.

In general, an LCD projector is a system which obtains a synthetic screen after screening each color generated from red, green and blue LCDs by means of a dichromatic mirror. Such a system was originated from a projection television system.

A projection television system obtains a final pixel on a large screen provided separately by radiating three specific cathode ray tubes having three primary colors of light; red, green and blue, transmitting and enlarging the pixel by using a magnifying lens and a reflecting mirror.

However, along with the development of semiconductor integrating technology and precision processing technology, recently, a method of driving each pixel by a specific driving apparatus has achieved high-quality and high-minuteness of the LCD panel by installing an RGB filter on a single LCD panel. Therefore, only projecting the light transmitted by irradiating parallel light from the rear side of the LCD panel by means of a projecting lens enables sufficiently high quality to be obtained.

In FIG. 1, an internal optical system is schematically shown in the conventional flat panel type LCD projector.

Referring to FIG. 1, there are installed a focusing lens system 11 composed of multiple convex and concave lenses, a condensing lens 12, an LCD panel 13 and a light source lamp 14, which are aligned on a common optical axis. In such an arrangement, unless the magnifying ratio of the condensing lens 12 is considerably large, the distance between the condensing lens 12 and the focusing lens system 11 cannot be reduced. In other words, the light irradiated from the light source lamp 14 is reflected by the concave hemispheric reflecting mirror 15 or directly irradiates the LCD panel 13 intensively. At this time, to place the image of the light source lamp 14 on the iris of the focusing lens system 11, the condensing lens 12 should have a predetermined magnification. Here, the condensing lens 12 is used for focusing as well as condensing. In order to reduce the distance between the focusing lens system 11 and the condensing lens 12 for the purpose of decreasing the size of the apparatus, the magnification of the condensing lens 12 should be considerably increased, as described above. This means that the lens should be thick. If the lens becomes thick, the spherical aberration is increased correspondingly, thereby making it difficult to correct the overall optical system. Also, as the thickness of the lens is increased, the chromatic aberration is increased, accordingly.

Meanwhile, FIG. 2 schematically shows a usage example of the conventional flat panel type LCD projector.

Referring to FIG. 2, since the projector 20 is movable, the optical axis is located in the center of the projector 20 and the projector 20 is mainly used in the state of placing on a table 30, an upward projection is necessary, compared to the optical axis of the lens, as shown. In such an instance, the optical axis of the lighting system is placed lower than the optical axis of the lens. That is to say, the optical axis gap of $\Delta y$ is produced, as shown in FIG. 1. In this connection, if the optical axis and the screen 40 are not perpendicular, a trapezoid distortion is generated on the screen 40. Therefore, as shown in FIG. 1, the LCD panel 13 is installed lower than the optical axis for an upward projection. However, in this case, since the lens should be designed for a broader image angle, the burden in manufacturing the lens becomes higher.

SUMMARY OF THE INVENTION

To solve the above problem, an object of the present invention is to provide a flat panel liquid crystal display projector which can prevent the image deterioration due to spherical aberration and chromatic aberration, reduce the burden in manufacturing the lens necessitated by an upward projection, and reduce the size of the apparatus.

To accomplish the above object, the single panel type liquid crystal display projector according to the present invention comprises:

a flat LCD panel oriented perpendicularly to a first optical axis;

lighting means having an illumination source surrounded by a parabolic reflecting mirror for irradiating parallel light onto a rear side of the LCD panel; and an optical lens system for focusing;

wherein the optical lens system is provided with a retro-focusing optical lens system which is located between the lighting means and the flat LCD panel, a flat reflecting mirror installed so as to be inclined with respect to the first optical axis at a predetermined angle of inclination, spaced apart by a predetermined distance from the LCD panel along the first optical axis so as to reflect light traveling along the first optical axis onto a second optical axis, and a focusing lens system composed of multiple lens groups arranged on the second optical axis and spaced apart by a predetermined distance from the intersection of the flat reflecting mirror and the first optical axis.

Since the burden in manufacturing the lens necessitated by an upward projection, produced in the conventional method is reduced by such a constitution as described above, and the overall size of the apparatus is diminished by reducing the length of the first optical axis with an optical axis changeable system including a flat reflecting mirror, the manufacturing cost for the apparatus can be reduced and a predominance can be obtained in the market competition.

BRIEF DESCRIPTION OF THE DRAWINGS

The above objects and other advantages of the present invention will become more apparent by describing in detail a preferred embodiment thereof with reference to the attached drawings in which.

DETAILED DESCRIPTION OF THE INVENTION

Figure 1:
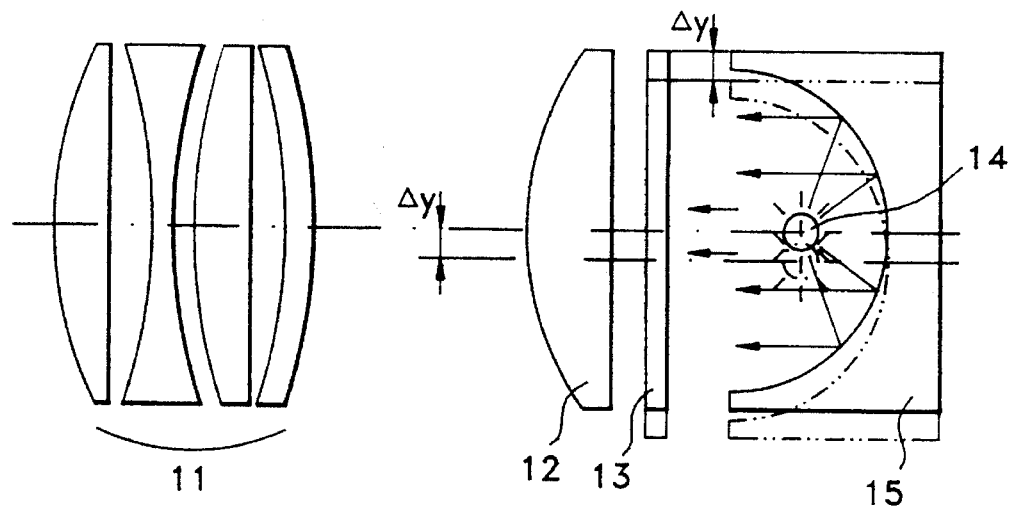
FIG. 1 is a schematic constitutional diagram of an optical system in a conventional flat panel liquid crystal display projector.
Figure 2:
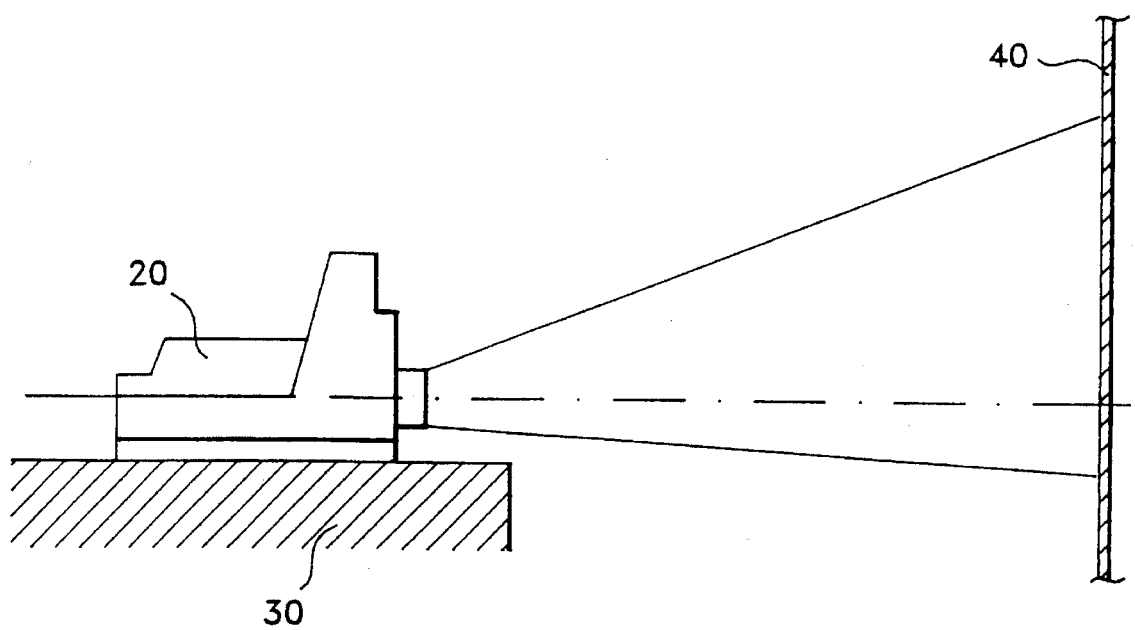
FIG. 2 is a schematic diagram for a usage example of the conventional flat panel liquid crystal display projector.
Figure 3:
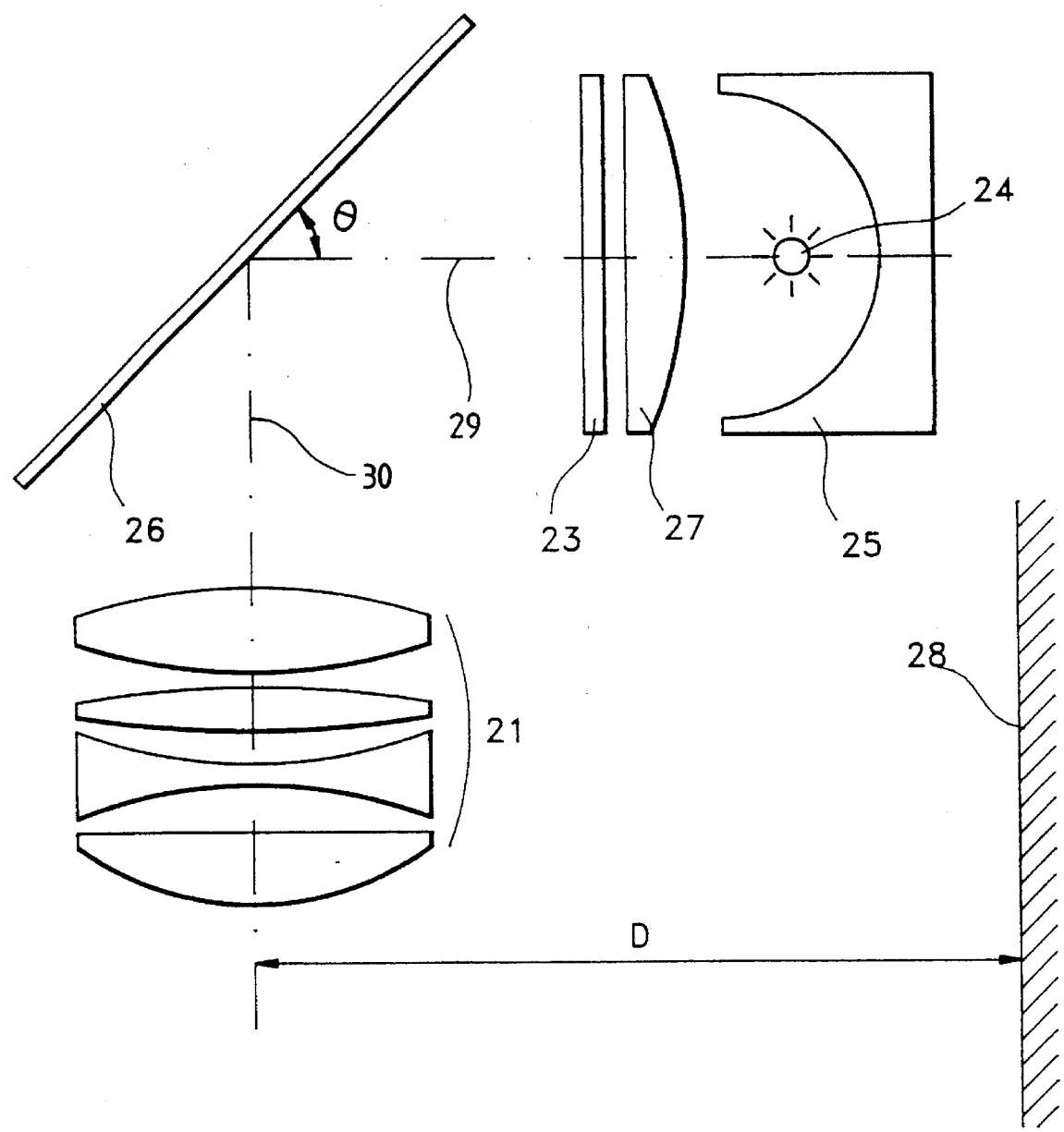
FIG. 3 is a schematic constitutional diagram of an optical system in the flat panel liquid crystal display projector according to the present invention.
Figure 4:
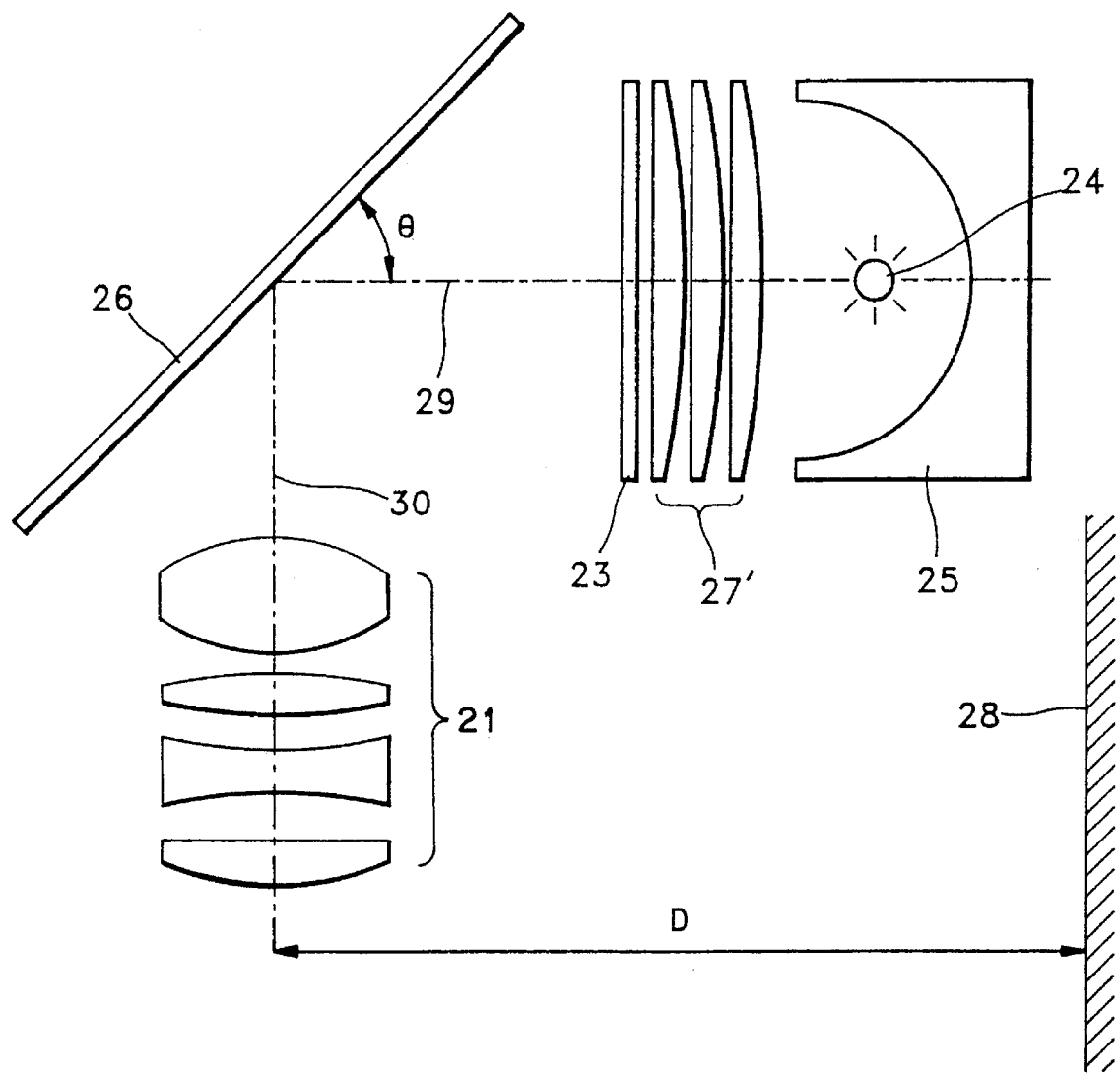
FIG. 4 is a schematic diagram of an optical system according to another embodiment of the flat panel liquid crystal display projector of the present invention.

Referring to FIG. 3, a lamp 24 for illumination, which is nearly a spot light source is installed on the central line of the optical axis 29 of a parabolic reflecting mirror 25 having a concave parabolic surface internally, spaced apart by a predetermined interval from the intersection of the parabolic surface and the central axis thereof. A retrofocusing optical lens system 27 whose one plane face arranged perpendicularly to the optical axis 29, is provided on the extension line of the optical axis 29, spaced apart by a predetermined interval from the lamp 24. That is to say, a lens whose one side is plane and whose other side is convex, having a predetermined curvature, is installed so that the convex surface thereof faces the lamp 24. Here, although it is shown in the drawing that one single convex lens is adopted as the retrofocusing optical lens system 27, two or more convex lenses 27 can be used to then be arranged in a mutually minute interval as depicted in FIG. 4. Also, such a lens structure is for condensing not for focusing. With respect to the retrofocusing optical lens system 27, a flat panel type LCD panel 23 is installed, spaced apart by a predetermined interval opposingly to the lamp and with the panel oriented perpendicularly to the optical axis. Also, a flat reflecting mirror 26 is installed so as to be inclined from the optical axis 29 at a predetermined angle θ, spaced apart along the optical axis by a predetermined interval from the flat panel type LCD panel 23. A focusing lens system 21 composed of multiple lens groups, spaced apart by a predetermined interval from the center of the flat reflecting mirror 26 is installed vertically on the inclined optical axis 30 whereonto the original optical axis 29 is bent at a predetermined angle of inclination by the flat reflecting mirror 26. Here, the inclined optical axis 30 of the focusing lens system 21 is made higher than a bottom surface 28 by a predetermined distance D in order to reduce the burden in manufacturing the lens necessitated by such an upward projection as in the conventional projector. Also, by placing the focusing lens system 21 on the bent optical axis which is inclined from the original optical axis, at a predetermined angle of inclination since the external size corresponding to that due to the arrangement of the overall optical axis in a straight line is not required, the miniaturization in the overall size of the apparatus is possible, after all.

Next, the operation of the single panel LCD projector according to the present invention, constituted as described above, will be briefly explained.

If power is applied to the driving apparatus (not shown) for driving the LCD panel 23 and the lamp 24 for lighting, and the apparatus is then operated, the light irradiated from the lamp 24 is incident to the lens of the retrofocusing optical system 27 directly or via the parabolic reflecting mirror 25. Thereafter, the transmitted light is incident to the flat panel type LCD panel 23 and among the incident light, the light selected by the liquid crystalline function of the flat panel type LCD panel 23 continuously goes straight ahead. Then, the transmitted light encounters the flat reflecting mirror 26 inclined at a predetermined angle of inclination with respect to the original optical axis 29 and is reflected thereby along a reflected optical axis. Thereafter, the reflected light is incident to the focusing lens system 21 depicted in FIG. 3. The focusing lens systems 21 is composed of convex and concave lens groups. The image projected by the focusing lens system 21 is projected to the large screen separately provided and is then visualized as a final screen.

In consideration of such series of processes, although the overall optical axis length itself is not reduced, since the external size of the apparatus can be reduced, compared to the case that the optical axis is longitudinally formed in a straight line, and only the optical axis direction is changed by the flat reflecting mirror without enlarging the lens ratio greatly, the projected image is not deteriorated due to spherical aberration and chromatic aberration.

As described above, since the single panel type liquid crystal display projector according to the present invention reduces the burden in manufacturing the lens necessitated by an upward projection as in the conventional method and miniaturizes the overall size of the apparatus by reducing the length of the optical axis with an optical axis changeable system using a flat reflecting mirror, the manufacturing cost for the apparatus can be reduced and a predominance can be obtained in the market competition.

What is claimed is:

1. A single panel type liquid crystal display projector comprising:

a flat LCD panel oriented particularly to a first optical axis;

lighting means having an illumination source surrounded by a parabolic reflecting mirror for irradiating parallel light; and an optical lens system including a retrofocusing optical lens system which is located between said lighting means and said flat LCD panel to receive parallel irradiated from said lighting means, a flat reflecting mirror installed so as to be inclined with respect to the first optical axis at a predetermined angle of inclination, spaced apart by a predetermined distance from said LCD panel along said first optical axis so as to reflect light traveling along said first optical axis into a second optical axis, and a focusing lens system composed of multiple lens group arranged on said second optical axis and spaced apart by a predetermined distance from the intersection of said flat reflecting mirror and said first optical axis, wherein said retrofocusing optical lens system is composed of two or more convex lenses.

2. A single panel type liquid crystal display projector comprising:

a light assembly including an illumination source surrounded by a parabolic mirror, said light assembly emitting parallel light along a first optical axis;

a retrofocusing optical lens system that condenses the parallel light emitted from said light assembly;

an LCD panel disposed perpendicularly to the first optical axis that creates an image and passes light condensed from said retrofocusing lens system;

a reflecting mirror disposed at an incline with respect to the first optical axis that reflects light passing through said LCD panel along a second optical axis; and a focusing lens system including a plurality of concave lenses and a plurality of convex lenses that focused the image created by said LCD panel, wherein said retrofocusing lens system includes two or more convex lenses.

* * * * *

UNITED STATES PATENT AND TRADEMARK OFFICE
CERTIFICATE OF CORRECTION

PATENT NO.   :   5,515,185
DATED        :   May 7, 1996
INVENTOR(S)  :   Kim

It is certified that error appears in the above-indentified patent and that said Letters Patent is hereby corrected as shown below:

Column 4, Line 36, change "into" to --onto--.

Signed and Sealed this

Sixteenth Day of July, 1996

Attest:

BRUCE LEHMAN

*Attesting Officer*    *Commissioner of Patents and Trademarks*